(12) United States Patent (10) Patent No.: US 8,366,541 B2
Luciano, Jr. et al. (45) Date of Patent: *Feb. 5, 2013

(54) GAMING MACHINE WITH VIRTUAL USER INTERFACE

(75) Inventors: Robert A. Luciano, Jr., Reno, NV (US); Lawrence C. McAllister, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,712

(22) Filed: Jan. 17, 2012

(65) Prior Publication Data

US 2012/0116556 A1 May 10, 2012

Related U.S. Application Data

(63) Continuation of application No. 11/620,363, filed on Jan. 5, 2007, now Pat. No. 8,100,750.

(51) Int. Cl.
*A63F 9/24* (2006.01)
(52) U.S. Cl. ........................................... 463/20; 463/29
(58) Field of Classification Search .................. 463/20, 463/29, 37
See application file for complete search history.

(56) References Cited

U.S. PATENT DOCUMENTS

| | | | |
|---|---|---|---|
| 6,089,976 A * | 7/2000 | Schneider et al. | 463/16 |
| 6,311,976 B1 | 11/2001 | Yoseloff et al. | |
| 7,949,677 B2 * | 5/2011 | Croft et al. | 707/781 |
| 2002/0075240 A1 * | 6/2002 | Lieberman et al. | 345/170 |
| 2003/0032479 A1 | 2/2003 | LeMay et al. | |
| 2005/0277467 A1 | 12/2005 | Karabin et al. | |
| 2006/0040739 A1 | 2/2006 | Wells | |
| 2006/0166727 A1 | 7/2006 | Burak | |
| 2007/0280203 A1 * | 12/2007 | Shaffer et al. | 370/352 |
| 2008/0108422 A1 | 5/2008 | Hedrick et al. | |
| 2008/0167123 A1 | 7/2008 | Luciano et al. | |
| 2009/0233705 A1 | 9/2009 | LeMay et al. | |
| 2012/0108337 A1 * | 5/2012 | Kelly et al. | 463/37 |
| 2012/0129600 A1 * | 5/2012 | Ealey | 463/31 |

FOREIGN PATENT DOCUMENTS

| | | |
|---|---|---|
| JP | 11-95895 | 4/1999 |
| JP | 2003-076495 | 3/2003 |
| JP | 2005-326905 | 11/2005 |

* cited by examiner

*Primary Examiner* — Pierre E Elisca

(74) *Attorney, Agent, or Firm* — Brooke Quist; Marvin Hein

(57) ABSTRACT

Methods for receiving and processing input on a gaming machine using a virtual user interface are disclosed herein. Gaming machines having a virtual user interface are also disclosed herein. According to one embodiment, the gaming machine includes a game display for presenting a game. The gaming machine also includes a virtual interface controller for generating and presenting a virtual user interface on a surface of the gaming machine where the virtual user interface receives user input for gaming or non-gaming functions. The gaming machine also includes a game controller in communication with the game display and the virtual interface controller.

31 Claims, 6 Drawing Sheets

GAMING MACHINE WITH VIRTUAL USER INTERFACE

CROSS-REFERENCE TO RELATED APPLICATIONS

This application is a continuation of U.S. patent application Ser. No. 11/620,363, filed Jan. 5, 2007, entitled GAMING MACHINE WITH VIRTUAL USER INTERFACE, which is hereby incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

Embodiments disclosed herein relate generally to the field of gaming and in particular to an electronic gaming machine having a virtual user interface.

BACKGROUND

The gaming industry is constantly exploring new and emerging technologies to improve quality, diversity and sophistication of gaming options offered to the casino patrons, without detracting from the patrons' gaming experience. More specifically, gaming machines capable of presenting multiple games at the same gaming machine have been developed. Since video games can differ substantially in their mode of operation from game to game, it may not always be possible to use the same set of electromechanical control buttons to control different games. Accordingly, it is possible to have a plurality of buttons or buttons with specialized functions that are not used in all the games, which may lead to player confusion and/or reduce the player's desire to gamble on the gaming machine. As a result, gaming machines presenting two or more games use touch screen technology to minimize the number of used electromechanical buttons.

However, it has been found that the display of virtual interfaces on the video display may significantly result in slow play and inconvenience players in certain circumstances. For example, casino patrons playing gaming machines having a touch screen system for vertically-positioned video displays may become fatigued over a prolonged period of gaming because the players need to repeatedly lift their arms during game play and do not have a surface to rest their arms and/or hands on the gaming machine. Accordingly, there remains a need for gaming machines having versatile and easy-to-use virtual interfaces that support a large variety of gaming options.

SUMMARY

Briefly, and in general terms, gaming machines having a virtual user interface are disclosed herein. According to one embodiment, the gaming machine includes a game display for presenting a game. The gaming machine also includes a virtual interface controller for generating and presenting a virtual user interface on a surface of the gaming machine where the virtual user interface receives user input for gaming or non-gaming functions. The gaming machine also includes a game controller in communication with the game display and the virtual interface controller.

In another embodiment, the gaming machine includes a game display for presenting one or more games. The gaming machine is similar to the previous embodiment except the gaming machine includes a network interface. The network interface is in communication with the game controller and a network server where the network interface downloads one or more games from the network gaming server.

In addition to gaming machines, methods for receiving and processing input on a gaming machine using a virtual user interface are disclosed herein. According to one method, a gaming machine having a game display for presenting a game is able to generate a virtual user interface on a surface of the gaming machine. The virtual user interface includes one or more virtual components that correspond to one or more game functions. The gaming machine receives and processes user input via the virtual user interface. The gaming machine then performs the game function corresponding to the user input.

According to another method, a gaming machine displaying a game is able to generate a first virtual user interface that is associated with the game. The first virtual user interface includes one or more virtual components. The gaming machine is able to detect a predefined event and generate a second virtual user interface where a portion of the second user interface is different from the first virtual user interface.

Methods for servicing a gaming machine using a virtual user interface are disclosed herein. According to one method, a gaming machine having a game display for presenting a game is able to generate a virtual user interface on a surface of the gaming machine. The virtual user interface includes one or more virtual components that correspond to one or more diagnostic or technical functions. The gaming machine receives and processes user input via the virtual user interface. The gaming machine then performs the diagnostic or technical functions corresponding to the user input.

Other features and advantages will become apparent from the following detailed description, taken in conjunction with the accompanying drawings, which illustrate by way of example, the features of the various embodiments.

DETAILED DESCRIPTION

Figure 1:
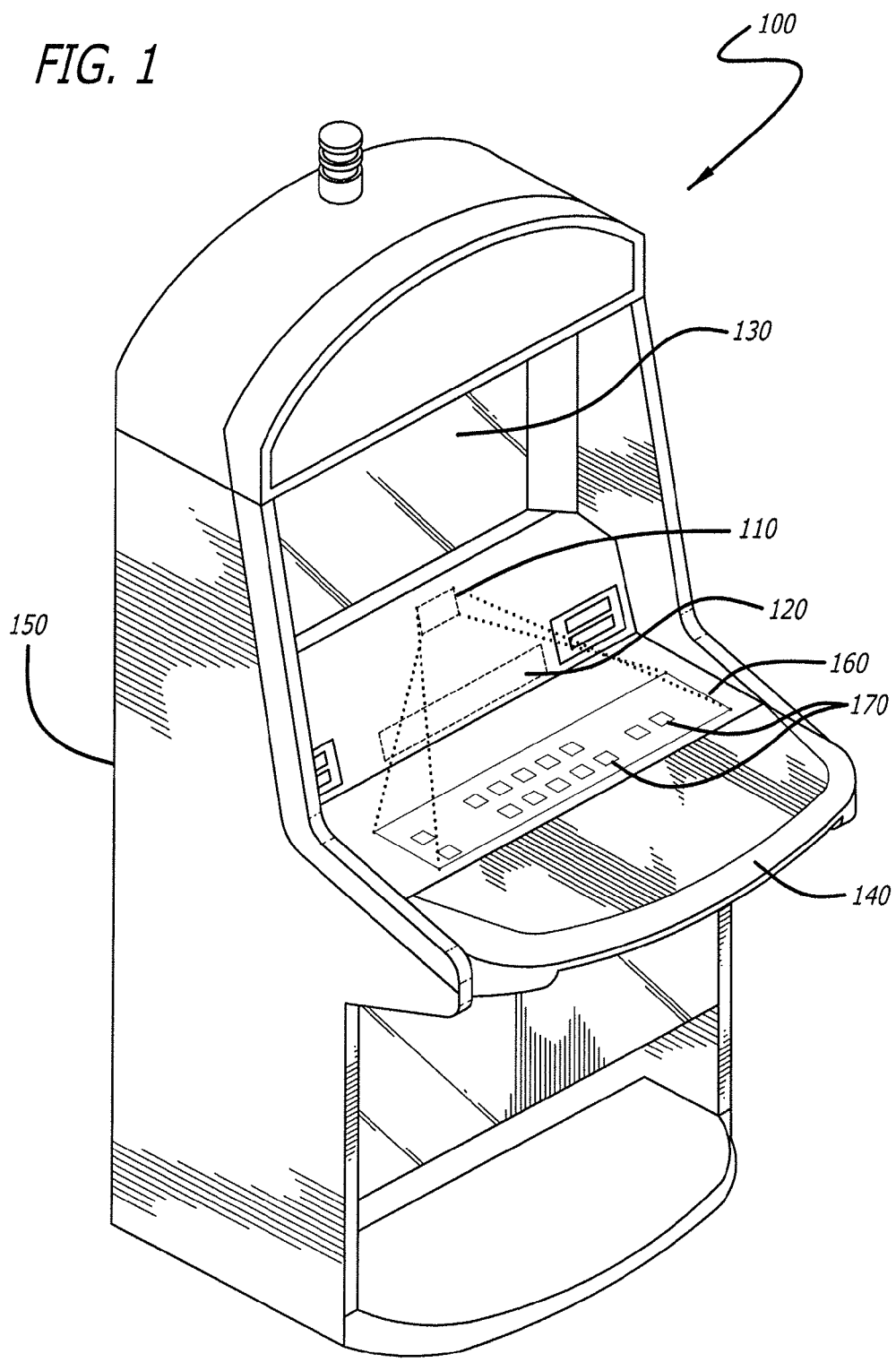
FIG. 1 is a perspective view of one embodiment of a gaming machine having a virtual user interface.

Various embodiments are directed to gaming machines having a virtual user interface. The user interface is "virtual" because it is a representation of the physical device. The virtual user interface may be a representation of a keyboard, one or more buttons, actuators, toggle switches, a touchpad, a mouse, or other input devices known or developed in the art that allow a player to interact with a game. According to one embodiment, the function of a virtual interface component (e.g., button) is presented within the boundaries that define virtual interface component (e.g., the button function is presented within the button). Alternatively, an icon, alphanumeric character, or function of the virtual user interface component is presented around (i.e., above, below, or otherwise adjacent) the virtual interface component.

The virtual user interface may be used to carry out various gaming functions such as, but not limited to, playing the game (e.g., spinning reels, selecting paylines, selecting cards, or discarding cards), making a wager (e.g., selecting a currency denomination or number of credits to wager), calling an attendant, accessing a help menu or pay table. Alternatively, the virtual user interface may include non-gaming functions such as, but not limited to, printing a voucher, inputting player identification data, calling an attendant, or accessing a help menu.

In another embodiment, the virtual user interface may be used for prize redemption. In this embodiment, the virtual user interface may be a QWERT keyboard, mouse, trackball, trackpad, or a combination thereof. The virtual user interface allows a player to browse through one or more menus or navigate through web sites. The player is able to use the virtual user interface to select a prize and optionally input personal information (e.g., name and address) and have the prize shipped to his or her home. For example, in one embodiment, the player may redeem player credits for merchandise on retailer websites such as Amazon.com or through a redemption center operated by one or more casinos.

The virtual user interface may be a replacement for (or a supplement to) traditional electromechanical buttons that are used to play a game. The virtual user interface is adaptable for use with various games and is capable of adjusting to games having frequent changes in game play. Additionally, the adaptability of the virtual user interface alleviates the costly and time-consuming process of having to physically change a gaming machine button panel when new games are added to or changed within a gaming machine. Furthermore, the virtual user interface may be modified (e.g., changing a virtual button function or a number of virtual buttons) in response to player input or a predetermined game event. As a result, the virtual user interface is tailored to the particular game or task without having any superfluous or unused input devices that may confuse a player. Reduced player confusion decreases idle time and improves the play rate for a gaming machine.

In yet another embodiment, the virtual user interface is specific to the current game being presented on the gaming machine. For example, the virtual controls for a slots-type game may include virtual interfaces for spinning reels, selecting paylines and wager amounts. In contrast, the virtual interfaces for a blackjack game would not include a virtual button for spinning reels or selecting paylines but rather the virtual controls would include virtual buttons for hitting, standing, doubling down, or splitting a hand. In another embodiment, the gaming machine may only present virtual controls when needed. For example, a virtual bonus button or reward button is presented to the player when a bonus game is being played, and the virtual button is removed when no longer needed.

Referring now to the drawings, wherein like reference numerals denote like or corresponding parts throughout the drawings and, more particularly to FIGS. 1-6, there are shown various embodiments of gaming machine 100 having a virtual user interface. More specifically, as shown in FIGS. 1-4, the virtual user interface includes a projection system 110 and a user input detection mechanism 120 that are in communication with the microprocessor (not shown) of the gaming machine 100. The projection mechanism 110 presents a user interface 160 (e.g., one or more virtual buttons) on a player console 140 of the gaming machine 100. The user input detection mechanism 120 obtains player input and determines the function selected by the user.

As shown in FIG. 1, the player console 140 is a generally flat surface of the gaming cabinet 150 that is positioned in close proximity to the main display 130. The player console 140 is positioned on the cabinet 150 so that it is comfortably and readily accessible to the player. As shown in FIG. 1, the player console 140 is at substantially a right angle relative to the main display 130. In other embodiments, however, the player console 140 may be positioned at any angle relative to the main display 130. In yet another embodiment, the player console 140 is player-adjustable for height, pitch, or depth. While the gaming cabinet 150 shown in FIG. 1 is a self-standing unit that is generally rectangular in shape, the cabinet (not shown) may be a slant-top, bar-top, or table-top style cabinet. However, any shaped cabinet may be used with any embodiment of the gaming machine 100. For example, the virtual user interface may be projected onto the "ergonomic gaming cabinet" disclosed in U.S. application Ser. No. 11/225,827, filed Sep. 12, 2005, which is hereby incorporated by reference.

FIG. 1 illustrates one virtual user interface 160 that is created by the virtual interface projection mechanism 110 and projected onto the player console 140. The virtual user interface 160 includes a virtual image of a plurality of components (e.g., buttons 170). In alternate embodiments, the virtual user interface (not shown) is a keyboard, keypad, track pad, or other input devices.

Figure 2:
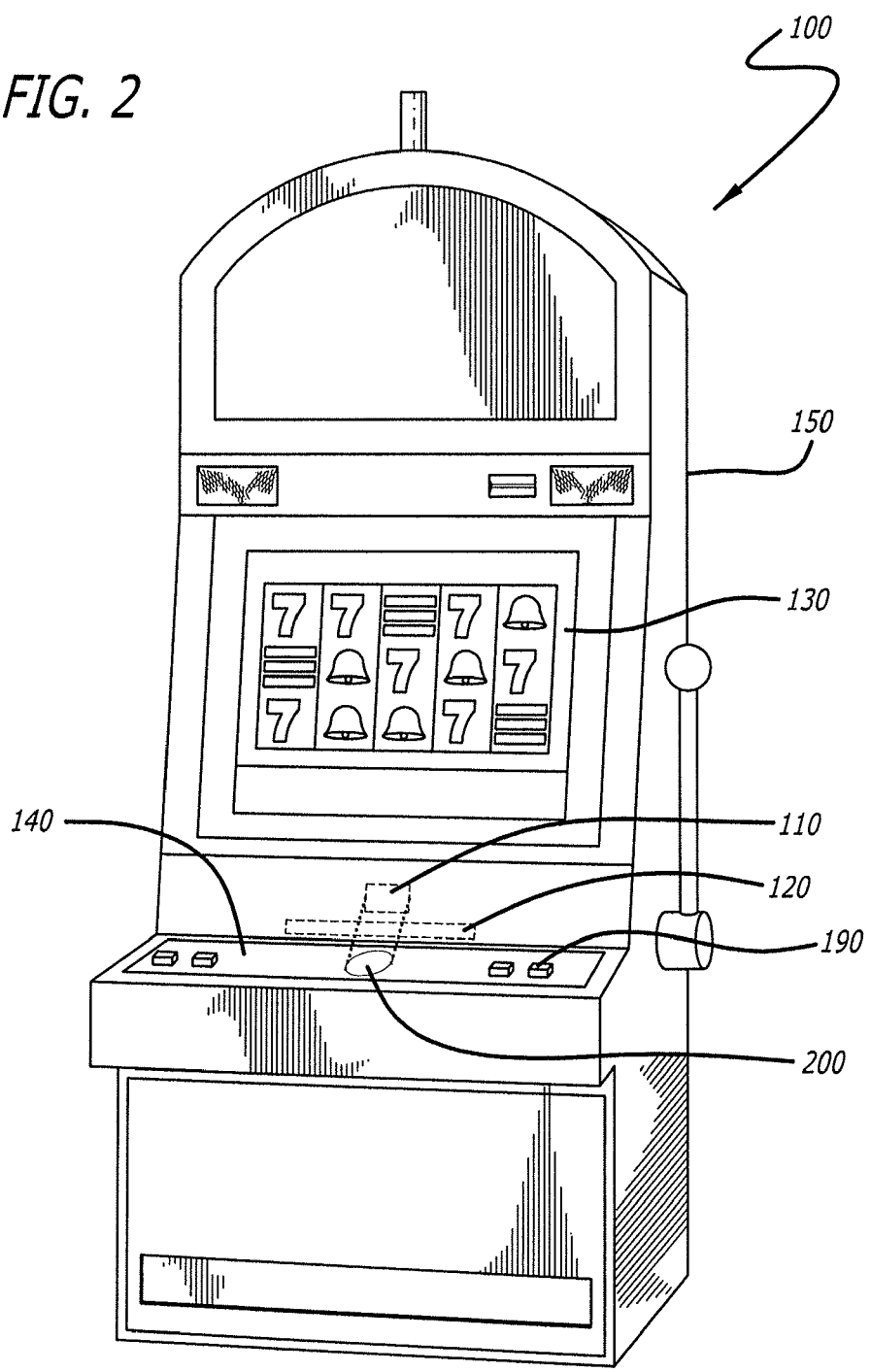
FIG. 2 is a perspective view of another embodiment of a gaming machine having a virtual user interface.

FIG. 2 illustrates another embodiment of a gaming machine 100 having a plurality of electromechanical buttons 190 as well a virtual user interface 200 that appears as needed. For example, the virtual user interface 200 may be a bonus spin button or other button associated with initiating and/or playing a bonus game. In this example, when the bonus game is triggered, the virtual user interface 200 is generated by the virtual interface projection mechanism 110 and presented on the player console 140. When the bonus game is completed, the virtual user interface 200 is no longer projected onto the player console 140.

Figure 3:
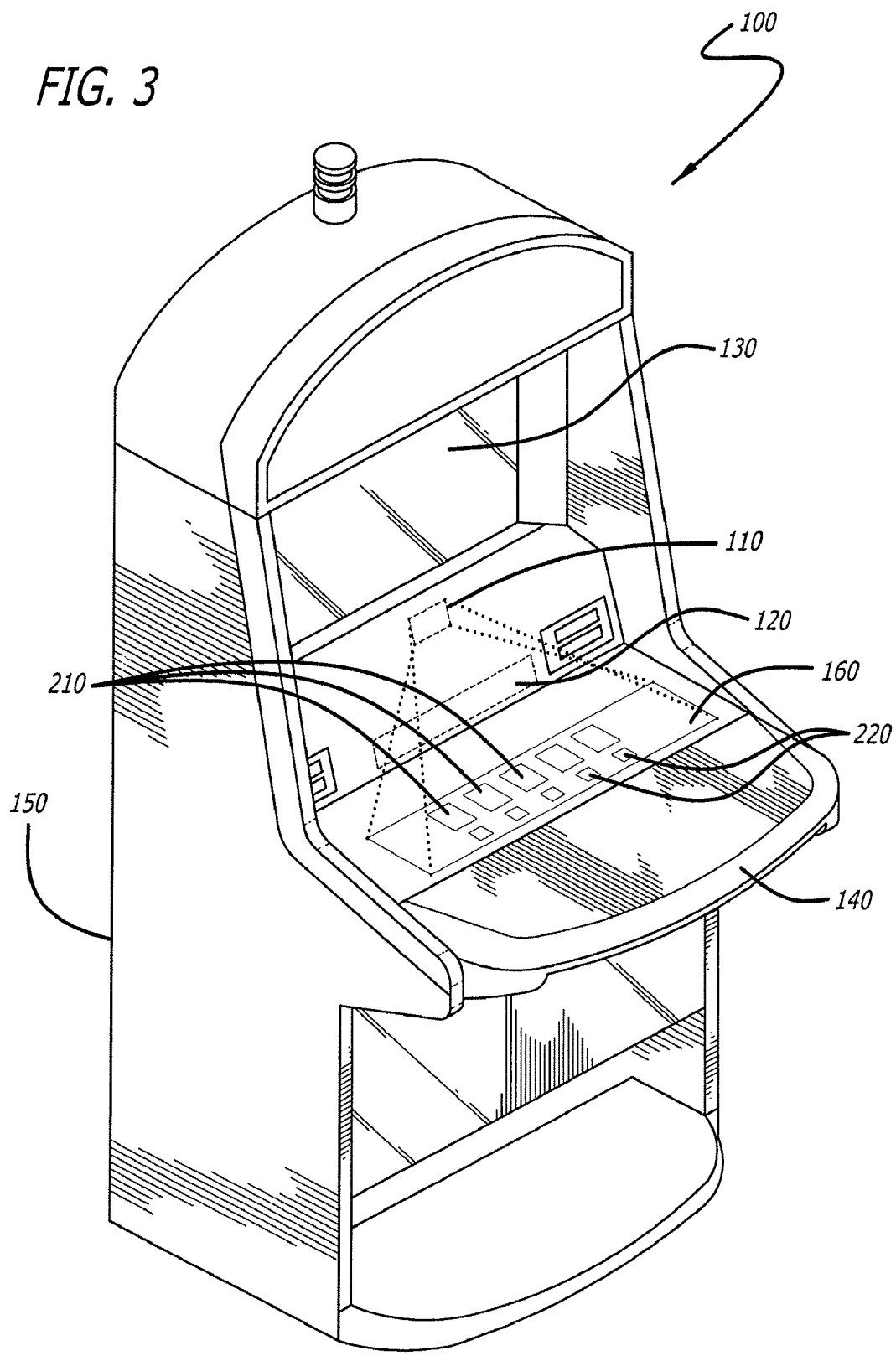
FIG. 3 a perspective view of yet another embodiment of a gaming machine having a virtual user interface.

FIG. 3 illustrates yet another embodiment of the virtual user interface 160 that also presents a virtual representation of one or more portions or components of a game, information presented on the main display or any secondary displays, pay tables, menus, advertisements, or a combination thereof. As shown in FIG. 3, the virtual user interface 160 includes a virtual representation of the individual cards 210 of a five-card poker hand may be presented in combination with a virtual hold button 220 for each card. In yet another embodiment, the virtual user interface (not shown) may present technical or diagnostic information on a virtual display screen when accessed by a casino employee. Furthermore, specific maintenance functions may be presented to the casino employee in the form of virtual buttons.

The virtual user interfaces 160, 200 depicted in FIGS. 1-3 are generated by a virtual interface projection mechanism 110. According to one embodiment, the mechanism 110 includes a beam-moving system (not depicted) having a light source (e.g., laser) producing one or more light beams, and a digital signal processor that modulates amplitudes of the light beams. The digital signal processor may use pulse amplitude modulation techniques or other methods know to those of skill in the art to modulate the light beams. The beam-moving system also includes a mirror array having one or more mirrors arranged to reflect the modulated light beams. Additionally, the beam-moving system includes an actuator such as, but not limited to, a servomotor that rapidly moves the mirror array. A virtual image of the virtual interfaces is formed when the modulated light beams are reflected off the moving minor onto a substantially flat surface.

In another embodiment, the virtual interface projection mechanism 110 includes a light source (e.g., a laser) and one or more fixed crystals. The fixed crystals are etched with a depiction of the user interface (e.g., keyboard, keypad, or one or more buttons). The virtual user interface is created by refracting light from the laser through the fixed crystal onto the player console 140. Multiple virtual user interfaces may be generated by using multiple pairings of a laser and fixed crystal. In this embodiment, a control logic manages the various laser/crystal pairings to present the appropriate virtual user interface. As those skilled in the art will appreciate, other systems and methods known and developed in the art may be used to generate virtual user interface.

In other embodiments, the virtual user interface (not shown) may be presented to a player through a display glass. The display glass is a darkened piece (e.g., smoked, tinted, or painted) of glass that is positioned on the gaming cabinet. In one embodiment, the display glass (not shown) is positioned on the player console 140. When not in use, the display glass is darkened. When in use, a virtual interface is visible through the display glass. The player input is detected with touchscreen, touch glass, near-field capacitance technology, or any other touch-based technology known or developed in the art.

According to one embodiment, the virtual interface is generated via an electroluminescent display coupled to a darkened (e.g., smoked) display glass. The electroluminescent display includes a plurality of layers that are deposited onto the display glass. The layers of a monochromatic electroluminescent display (moving away from the surface of the display glass) include an electrode layer deposited onto the display glass, an insulator layer positioned over the electrode layer, a phosphor layer positioned over the insulator layer, another insulator layer positioned over the phosphor layer, and another electrode layer positioned over the insulator layer. For a color electroluminescent display, one or more filtering layers (e.g., a Red-Blue-Green filter) are positioned between the display glass and the first layer of electrodes.

The electroluminescent display is controlled by the gaming machine processor via an electroluminescent display driver. Since the electroluminescent displays comprise a plurality of illumination points that are addressable as pixels, software engineering techniques that are used for pixelized displays may also be used to create and send images to the electroluminescent display. For example, image generating software is run on a processor (e.g., general or graphics) with the appropriate electroluminescent display driver results in the presentation of the virtual user interface on the player console.

When the electroluminescent display is not illuminated, the display glass is a darkened piece of glass. When the electroluminescent display is illuminated, various user interfaces such as, but not limited to, a QWERTY keyboard or one or more player buttons are presented to the player. In other embodiments, the user interface is customized to the game, game style, or game features. As those skilled in the art will appreciate, each component of virtual user interface has a defined location on the player console. That is, the images of two virtual components cannot be located in the location on the player console.

In another embodiment, a virtual user interface (not shown) may be projected from beneath the player console onto the display glass (or touch glass) via projection technology such as, but not limited to, LCD, DLP, or other light-emitting devices. In yet another embodiment, static graphic images are printed onto the back of a smoked glass touch screen that is illuminated from behind the touch glass. When the backlight is illuminated, the graphics appear.

The gaming machine 100 also includes a user input detection mechanism 120 that detects user input via the virtual user interface 160. The user input detection mechanism 120 projects a detection field over the virtual user interface and determines the location of the user's finger and correlates that location with the corresponding function. According to one embodiment, the detection mechanism 120 includes a laser beam generator capable of generating one or more laser beams over the area or surface of which the virtual user interface is projected thereon. Alternatively, the detection mechanism includes an infrared (IR) beam generator that projects one or more IR beams over the player console 140. The detection mechanism also includes two or more optical sensors such as, but not limited to, an array of charge-coupled devices (CCD) that detect laser beam reflections or shadows when a virtual virtual interface button is touched. The user input detection system 120 measures the angle of the laser (or IR) reflections (with respect to the normal laser position) to determine location of the user's finger. The microprocessor 430 then compares the detected location of the user's finger to the known position of the virtual user interface to determine and perform the selected function. Additionally, the user input detection system 120 determines the height of the player's fingers above the projected virtual user interface and whether the player's finger breaks the plane of the laser (or IR) beam. As a result, the system 120 is able to detect when a player's finger presses and releases a virtual player control button.

In another embodiment, the user input detection mechanism 120 is composed of one or more electronic cameras such as, but not limited to, CCD-based cameras. According to one embodiment, a first CCD-based camera is placed in front of the virtual user interface, and a second CCD-based camera is positioned above the area where the virtual user interface is projected. The cameras capture images regarding the position of user's hands and the height above the surface where the virtual user interface is projected. The microprocessor 430 analyzes each consecutive image to determine whether the position and height of the user's fingers have changed relative to the preceding image. If these parameters change, the microprocessor 430 determines the new location of the user's finger. The microprocessor 430 then determines whether a particular function of the virtual interface was selected by comparing the detected position of the user's finger relative to the position of the virtual user interface. If a function has been selected, the microprocessor 430 performs the action associated with the selected component of the virtual user interface.

In yet another embodiment, the user input detection mechanism 120 is a touch pad, touch glass, or a touch screen system. In this embodiment, the virtual interface projection mechanism projects the virtual user interface onto the surface of the touch pad or touch glass. The touch screen and/or touch glass uses sensing technology such as capacitive "near-field" imaging to sense the presence and removal of a player's finger from the touch screen or glass.

Figure 4:
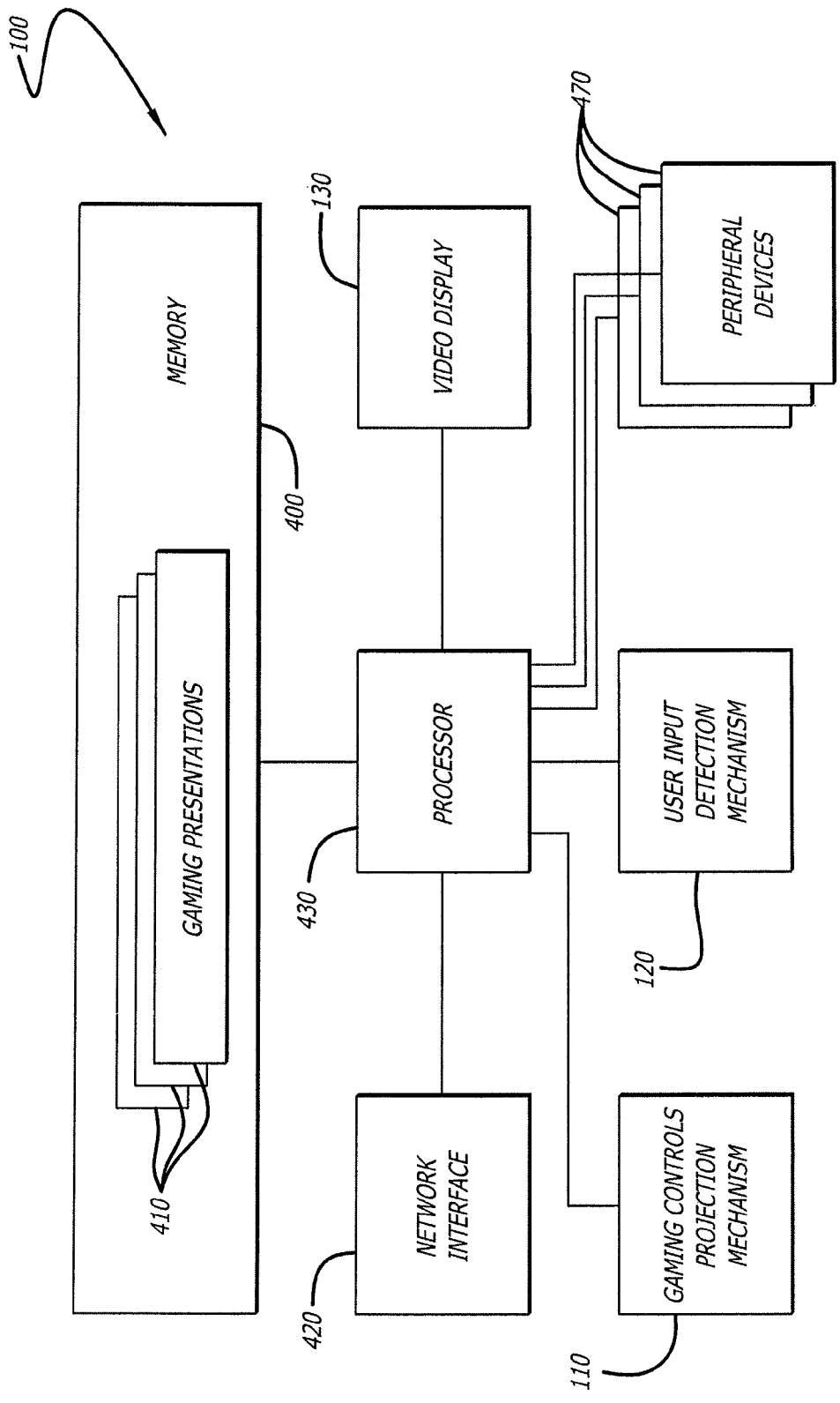
FIG. 4 illustrates a block diagram of one embodiment of the gaming machine having a virtual user interface.

FIG. 4 shows the various components found within the gaming machine 100. The gaming machine 100 includes a microprocessor 430 that implements the programming logic of one or more games and controls the operation of the hardware and software components of the gaming machine. The microprocessor 430 is in communication with and controls one or more peripheral devices 470 (e.g., bill acceptor, ticket printer, card reader, player tracking system), video display 130, and non-volatile memory 400 that stores one or more gaming presentations 410. The microprocessor 430 also controls a projection mechanism 110 that presents the virtual user interface 160. Additionally, as shown in FIG. 4, the microprocessor 430 is in communication with a network interface 420 that allows the transmission and receipt of data to and from a network server (not shown).

As shown in FIG. 2, the gaming machine 100 includes one or more peripheral devices 470. For example, the gaming machine 100 may comprise a player identification device, such as a magnetic card reader that accepts a player-identification card issued by the casino. The gaming machine 100 also includes one or more credit input devices such as, but not limited to, a coin acceptor, bill acceptor, ticket reader, and card reader. In one embodiment, the bill acceptor and the ticket reader may be combined into a single unit. The card reader may accept credit cards, debit cards, and smart (chip) cards coded with money or designating an account containing money. In one embodiment, the gaming machine 100 may also include an embedded additional user interface (not depicted), such as an iView™ interface described in the commonly owned U.S. Pat. No. 7,950,999, issued May 31, 2011, entitled USER INTERFACE SYSTEM AND METHOD FOR A GAMING MACHINE, which is incorporated by reference herein. The content provided through the embedded additional user interface may include, for example, advertisements, promotion notifications, useful gaming information, and other content that may be of interest to the casino patron.

The game display 130 presents one or more games of chance such as, but not limited to, mechanical slots, video slots, video keno, video poker, video blackjack, video roulette, or Class II bingo. In alternate embodiments, the game display 130 may present games of skill or games of chance involving some player skill. In one embodiment, the game display is a cathode ray tube (CRT) display. Alternatively, the game display 130 is a flat panel display including by way of example only, and not by way of limitation, liquid crystal, plasma, electroluminescent, vacuum fluorescent, field emission, LCOS (liquid crystal on silicon), and SXRD (Silicon Xtal Reflective display), or any other type of panel display known or developed in the art. These flat panel displays may use panel technologies to provide digital quality images including by way of example only, and not by way of limitation, EDTV, HDTV, or DLP (Digital Light Processing). The display may have a 4:3, 16:9, 5:4, 19:10, or any other aspect ratio known or developed in the art and may be mounted in the gaming cabinet in a portrait or landscape orientation. Additionally, the game display 130 may also include a touch screen or touch glass system (not shown).

In another embodiment, the game display (not shown) comprises a plurality of mechanical reels positioned behind a display glass that frames a portion of each reel. For example, the display glass shows a portion of each reel such that three indicia positions of each reel are visible to the player. In yet another embodiment, the game display (not shown) comprises a combination of mechanical reels and video depictions of reels.

As shown in FIGS. 1-3, the gaming machine 100 also includes a cashless gaming system 180. The cashless gaming system 180 generally includes a ticket printer and ticket reader. The ticket printer and ticket reader may be separate or integral components. As shown in FIGS. 1-3, the same slot 185 may be used to insert and/or issue a ticket. Alternatively, the ticket reader and the ticket printer have separate slots (not shown) for receiving and issuing tickets, respectively. In one embodiment, the ticket reader of the cashless gaming system 180 is capable of accepting previously printed vouchers, paper currency, promotional coupons, or the like. The ticket printer of the cashless gaming system 180 generates vouchers having printed information that includes, but is not limited to, the value of the voucher (i.e., cash-out amount) and a barcode that identifies the voucher.

In another embodiment, one or more gaming machines 100 are in communication with a player tracking system (not shown). The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or compensate a player with free meals, room accommodations, tickets to shows, and invitations to casino events and promotional affairs.

Typically, the player tracking system is operatively connected to one or more input components on the gaming machine 100. These input components include, but are not limited to, a slot for receiving a player tracking card, a keypad or equivalent, an electronic button receptor, a touch screen, and the like. In one embodiment, a virtual user interface is used to obtain player information and/or allow the player to access their player account. The player tracking system 100 may also include a database of all qualified players (i.e., those players who have enrolled in a player rating or point accruing program). Generally, the database for the player tracking system 32 is separate from the gaming machines 100.

As shown in FIG. 3, the network interface 420 includes one or more network cards that facilitates IP-based communication with other networked devices such as, but not limited to, a gaming network server. For example, the network interface 420 may be used to download one or more gaming presentations from the gaming network server. In another example, the network interface 420 may be used to communicate with an accounting server (not depicted), that is connected to financial institutions in order to verify a player's credit request. In another example, in a progressive network environment, (i.e., where several gaming machines 100 compete for a single jackpot prize), the network interface 420 may be used to communicate with other gaming machines, as well as with a game monitoring server (not depicted) to synchronize the jackpot value and other parameters.

One of ordinary skill in the art will appreciate that not all gaming machines 100 have all these components and may have other components in addition to, or in lieu of, those components mentioned here. Furthermore, while these components are viewed and described separately, various components may be integrated into a single unit in some embodiments.

Figure 5:
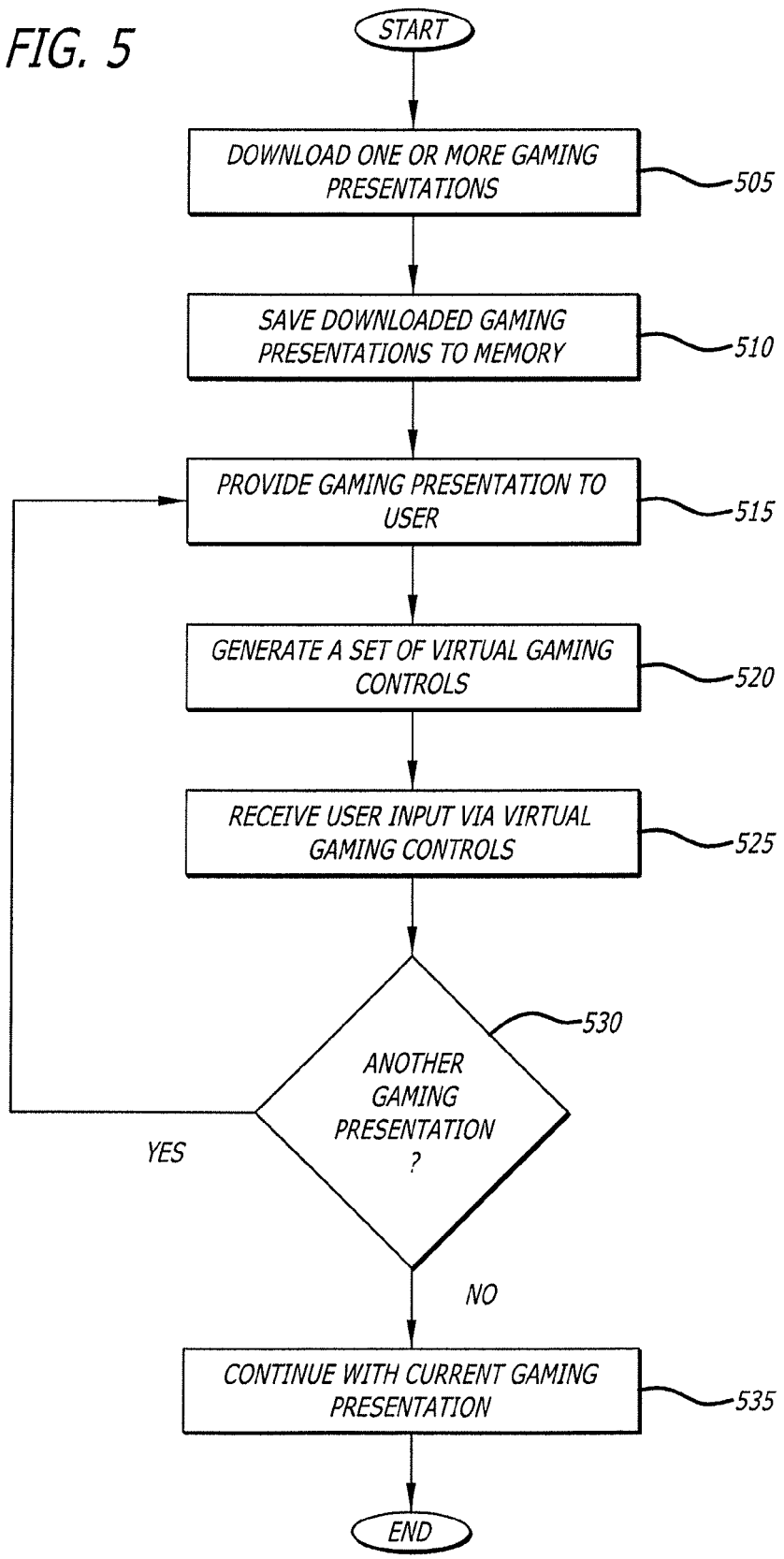
FIG. 5 is a flow diagram of a gaming method using a virtual user interface.

FIG. 5 illustrates one method for gaming with a virtual user interface. According to one method, at step 505, the gaming machine downloads one or more games from the gaming network server. According to one method, the downloaded games may be saved in the non-volatile memory of the gaming machine at step 510. At step 515, a game selection menu is presented on the video display of the gaming machine that allows a player to select a game. A virtual user interface is presented that allows a player to select a game to play at step 520. Using the generated virtual controls, the gaming machine receives player input selecting a game, placing a wager, and user input regarding game play at step 530. At the end of the game, the gaming machine presents the player with the option to play the same game or to select another game to play. If the user selects a new game, the gaming machine loads the new game from its memory or downloads the game from the network server. Once the new game is selected, a virtual user interface that corresponds to the new game is presented to the player. Otherwise, the user may continue playing the originally selected game.

Figure 6:
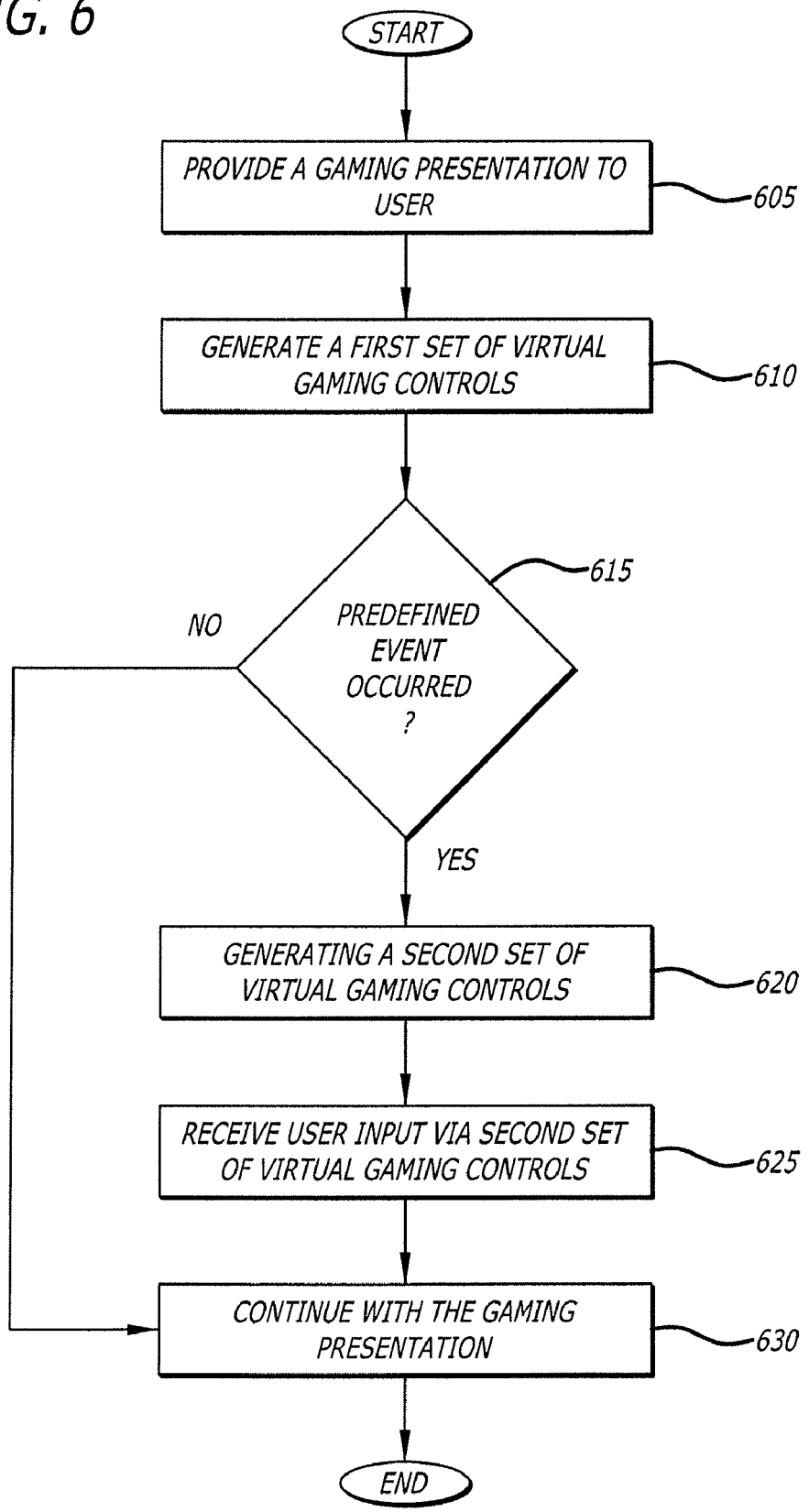
FIG. 6 illustrates a flow diagram of another gaming method using a virtual user interface.

FIG. 6 illustrates another method for gaming with a virtual user interface. At steps 605 and 610, the gaming machine presents a game and a virtual user interface to a player, respectively. At step 615, the gaming system monitors the game for a predetermined triggering event. The triggering event may be a particular winning outcome (e.g., 7-7-7), rate of play, duration of game play, amount wagered, claiming or selection of a prize, or any other triggering event related or unrelated to a game outcome. According to one method, if a triggering event is satisfied, a new virtual user interface is generated at step 620. The new virtual user interface may include an additional virtual button such as, but not limited to, a bonus button or reward button or full QWERTY keyboard and/or touch pad. Alternatively, the new virtual user interface may remove unused buttons from the originally presented virtual user interface. In another method, the location of the virtual buttons may remain the same, but the associated function for the buttons may be different for the newly generated virtual user interface. At step 625, the gaming system processes the player input and carries out the desired function and the game continues at step 630.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method for receiving and processing input on a gaming machine, the method comprising:
   providing a gaming machine having a plurality of primary games selectable by a player for play on a game display;
   generating a first virtual user interface on a surface of the gaming machine, wherein the first virtual user interface includes one or more virtual components corresponding to a primary game selectable by the player;
   generating a second virtual user interface on the surface of the gaming machine, wherein the second virtual user interface includes one or more virtual components corresponding to one or more game functions for the selected game; and
   generating a third virtual user interface in response to player input or a triggering event, wherein the third virtual user interface includes one or more components that correspond to one or more game functions not present on the first or second virtual user interface.

2. The method of claim 1, further comprising:
   generating a virtual representation of a portion of the game; and
   projecting the virtual representation of the portion of the game onto the surface of the gaming machine.

3. The method of claim 1, further comprising generating and projecting a virtual representation of non-game related information onto the surface of the gaming machine.

4. The method of claim 1, wherein generating the first virtual user interface comprises projecting one or more laser beams onto the surface of the gaming machine.

5. The method of claim 1, wherein the one or more functions are game play functions, non-game play functions, diagnostic functions, technical functions, or a combination thereof.

6. The method of claim 1, wherein receiving and processing the player input further comprises:
   generating a detection field that is in a spaced relationship with the first virtual user interface;
   detecting the reflections of the detection field in response to player input;
   determining a position of the player input; and
   correlating the player input with the game function of the first virtual user interface.

7. A method for receiving and processing player input on a gaming machine, the method comprising:
   providing a gaming machine having a plurality of primary games selectable by a player for play on a game display;
   generating a first virtual user interface on a surface of the gaming machine, wherein the first virtual user interface includes one or more virtual components that correspond to one or more game functions of a first game;
   generating a second virtual user interface in response to player input selecting a second game, wherein the second virtual user interface includes one or more virtual components that correspond to one or more game functions of the second game, and wherein the first and second virtual user interfaces have at least one different game function; and
   generating a third virtual user interface in response to player input or a triggering event, wherein the third virtual user interface includes one or more components that correspond to one or more game functions not present on the first or second virtual user interface.

8. The method of claim 7, further comprising:
   generating a virtual representation of a portion of the game; and
   projecting the virtual representation of the portion of the game onto the surface of the gaming machine.

9. The method of claim 7, further comprising generating and projecting a virtual representation of non-game related information onto the surface of the gaming machine.

10. The method of claim 7, wherein receiving and processing the player input further comprises:
    generating a detection field in a spaced relationship with the first virtual user interface;
    detecting the reflections of the detection field in response to player input;
    determining a position of the player input; and
    correlating the player input with the game function of the first virtual user interface.

11. A method for servicing a gaming machine, the method comprising:
    providing a gaming machine having a plurality of primary game selectable by a player for play on a game display;
    generating a first virtual user interface on a surface of the gaming machine, wherein the first virtual user interface includes one or more components that correspond to one or more diagnostic or technical functions;
    generating a second virtual user interface in response to player input or a triggering event, wherein the second virtual user interface includes one or more components that correspond to one or more diagnostic or technical functions;
    generating a third virtual user interface in response to player input or a triggering event, wherein the third virtual user interface includes one or more components that correspond to one or more diagnostic or technical functions;

receiving and processing user input via a virtual user interface; and performing the diagnostic or technical function corresponding to the user input.

12. The method of claim 11, further comprising:

generating a second virtual user interface in response to user input; and projecting the second virtual user interface onto the surface of the gaming machine.

13. A method for using a gaming machine, the method comprising:

displaying a game on the gaming machine;

generating a first virtual user interface associated with the game, wherein the first virtual user interface includes one or more virtual components;

detecting a predefined event; and generating a second virtual user interface in response to the detected event, wherein a portion of the second virtual user interface is different from the first virtual user interface; and generating a third virtual user interface in response to a player input or a triggering event.

14. The method of claim 13, wherein the predefined event is a particular outcome of the game.

15. The method of claim 13, wherein the predefined event is a non-gaming event.

16. A gaming machine having a plurality of primary game selectable by a player for play, comprising:

a game display for presenting a game selected by the player for play;

a virtual interface controller for generating and presenting a first virtual user interface on a surface of the gaming machine in response to player input or a triggering event, generating and presenting a second virtual user interface on a surface of the gaming machine in response to a player input or a triggering event, and generating and presenting a third virtual user interface in response to a player input or a triggering event, wherein each virtual user interface receives user input for gaming or non-gaming functions, and wherein each virtual user interface is specific to each game selectable for play on the gaming machine; and a game controller in communication with the game display and the virtual interface controller.

17. The gaming machine of claim 16, further comprising one or more electromechanical buttons.

18. The gaming machine of claim 16, further comprising a network interface in communication with the microprocessor and a network gaming server, wherein the network interface downloads one or more games from the network gaming server.

19. The gaming machine of claim 16, wherein the virtual interface controller further comprises a projection system for generating the virtual user interface and an input detection system for determining the user input via the virtual user interface.

20. The gaming machine of claim 19, wherein the projection system further comprises one or more lasers.

21. The gaming machine of claim 19, wherein the input detection system further comprises two or more lasers projected above the virtual user interface.

22. The gaming machine of claim 19, wherein the input detection system further comprises two or more optical sensors.

23. The gaming machine of claim 19, wherein the input detection system further comprises a near-field capacitance system coupled to the surface of the gaming machine.

24. The gaming machine of claim 16, wherein the virtual user interface is a keyboard.

25. A gaming machine, comprising:

a game display for presenting a game that is selected by a player from one or more games provided on the gaming machine;

a virtual interface controller for generating and presenting a virtual user interface on a surface of the gaming machine, wherein the virtual user interface receives player input for gaming or non-gaming functions to generate a first virtual user interface in response to player input or a triggering event, a second virtual user interface in response to another player input or a triggering event, and a third virtual user interface in response to another player input or a triggering event;

a game controller in communication with the game display and virtual interface controller; and a network interface in communication with the game controller and a network server, wherein the network interface downloads the one or more games from the network gaming server.

26. The gaming machine of claim 25, wherein the virtual interface controller further comprises a projection system for generating the virtual user interface and an input detection system for determining the player input via the virtual user interface.

27. The gaming machine of claim 26, wherein the projection system further comprises one or more lasers.

28. The gaming machine of claim 26, wherein the input detection system further comprises two or more lasers projected above the virtual user interface.

29. The gaming machine of claim 26, wherein the input detection system further comprises two or more optical sensors.

30. The gaming machine of claim 19, wherein the input detection system further comprises a near-field capacitance system coupled to the surface of the gaming machine.

31. The gaming machine of claim 25, wherein the virtual user interface is a keyboard.

* * * * *

UNITED STATES PATENT AND TRADEMARK OFFICE
CERTIFICATE OF CORRECTION

PATENT NO. : 8,366,541 B2
APPLICATION NO. : 13/351712
DATED : February 5, 2013
INVENTOR(S) : Robert A. Luciano, Jr. and Lawrence C. McAllister It is certified that error appears in the above-identified patent and that said Letters Patent is hereby corrected as shown below:

In the Specification

Column 3, in line 21, change "QWERT" to --QWERTY--

Column 6, in line 20, remove "virtual" after "a"

Signed and Sealed this
Twenty-second Day of October, 2013

Teresa Stanek Rea
*Deputy Director of the United States Patent and Trademark Office*